April 23, 1968
G. N. WILLIS
3,379,298
INDEXING ASSEMBLY MACHINE
Filed Jan. 28, 1966
7 Sheets-Sheet 1
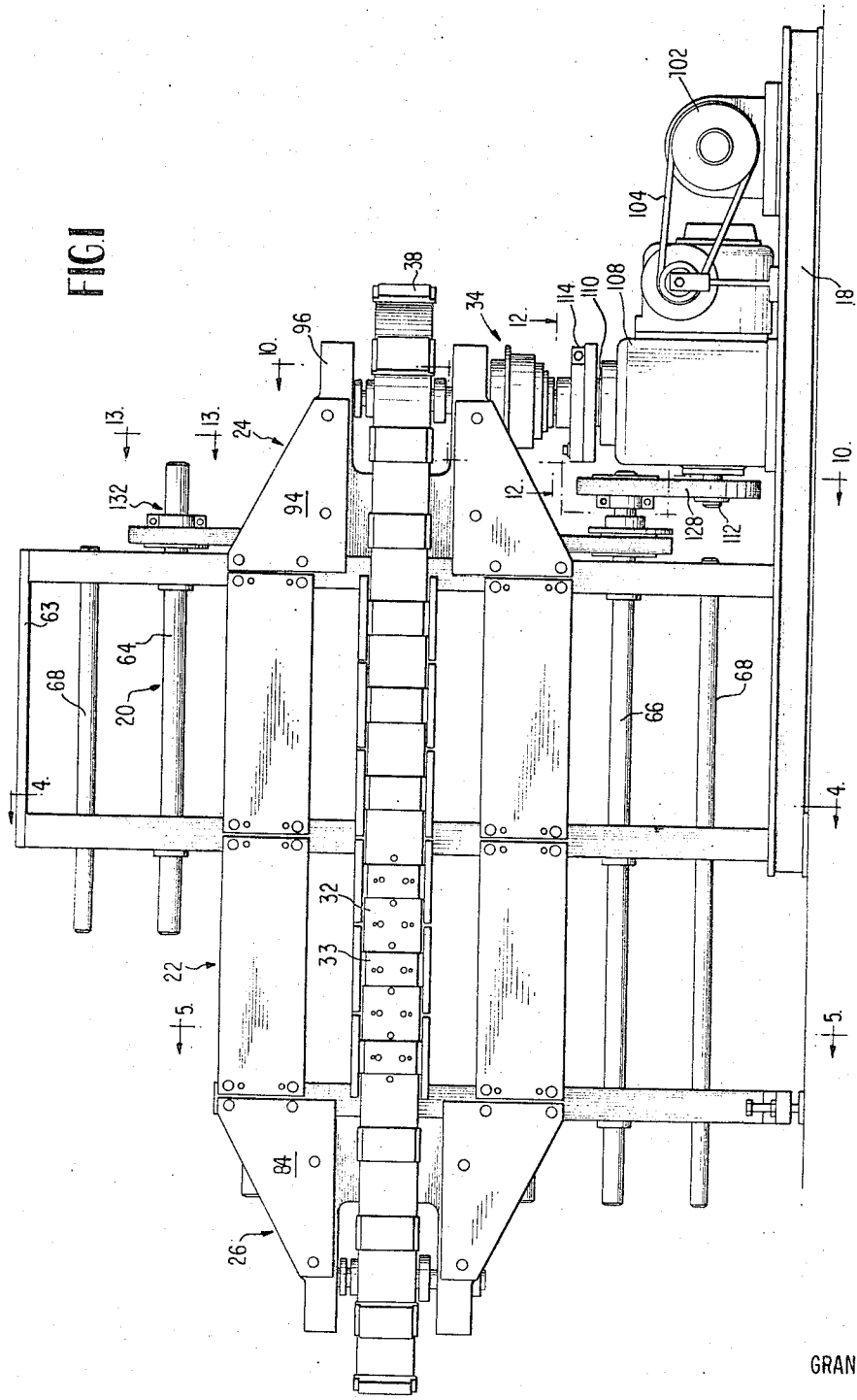
INVENTOR
GRANT NOBLE WILLIS
BY *Lindsey, Prutzman and Hayes*
ATTORNEYS April 23, 1968
G. N. WILLIS
3,379,298
INDEXING ASSEMBLY MACHINE
Filed Jan. 28, 1966
7 Sheets-Sheet 2
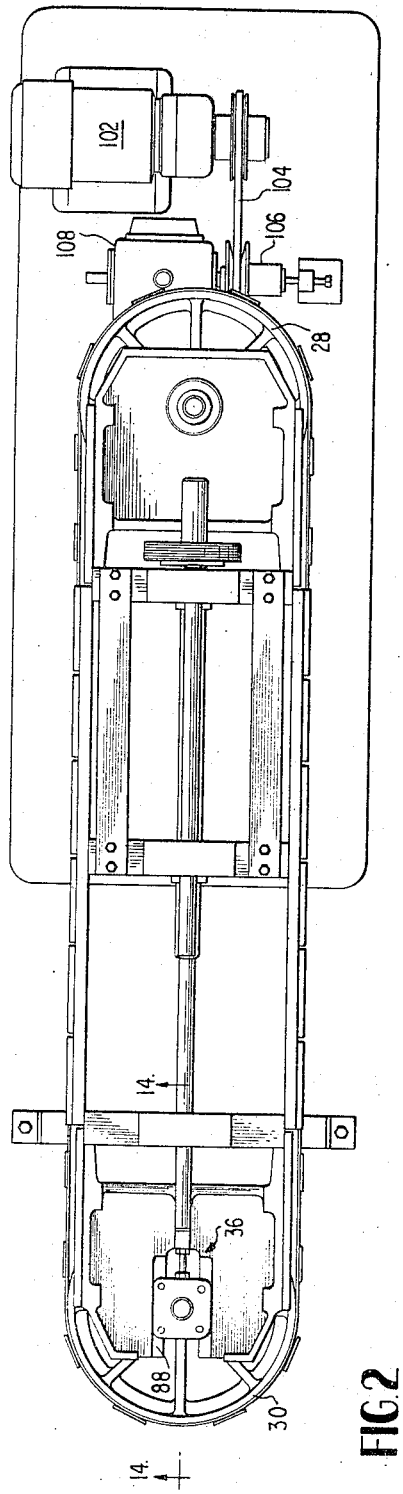
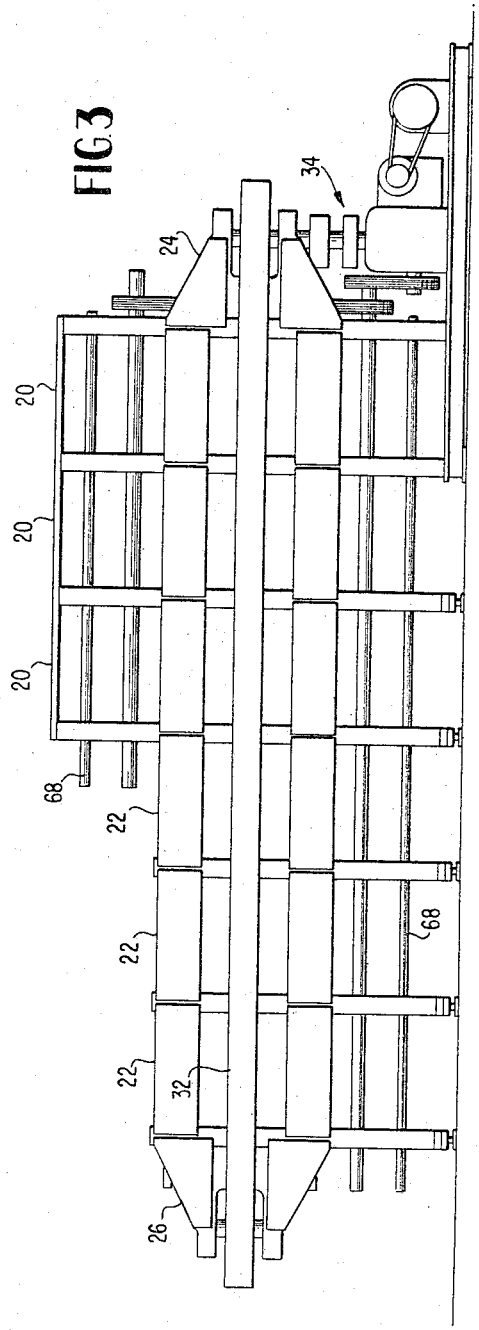
INVENTOR
GRANT NOBLE WILLIS
BY *Lindsey, Prutzman and Hayes*
ATTORNEYS

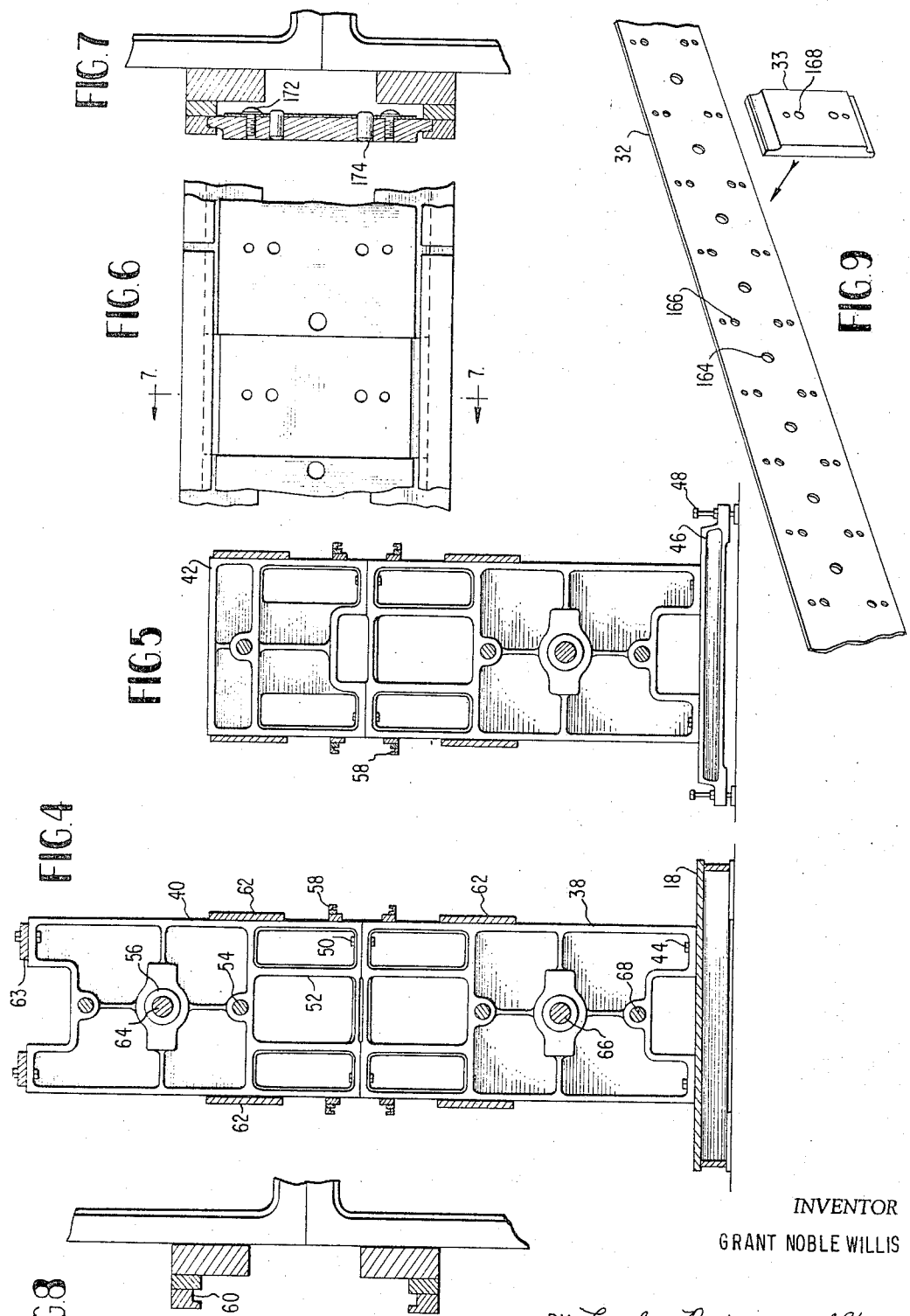

April 23, 1968 G. N. WILLIS 3,379,298
INDEXING ASSEMBLY MACHINE
Filed Jan. 28, 1966 7 Sheets-Sheet 4
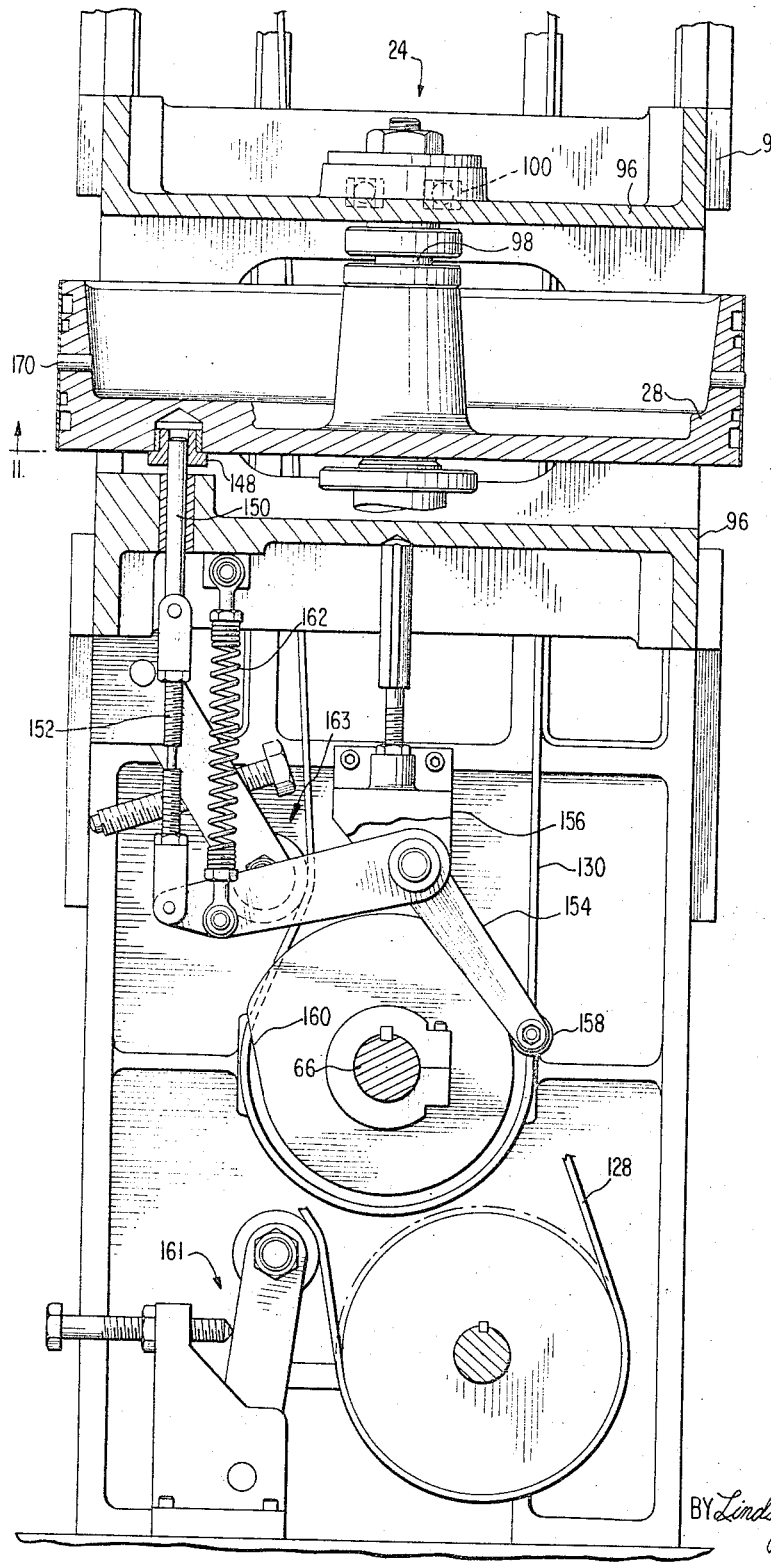
INVENTOR
GRANT NOBLE WILLIS
BY Lindsey, Prutzman and Hays
ATTORNEYS

INVENTOR
GRANT NOBLE WILLIS

BY *Lindsey, Prutzman and Hayes*

ATTORNEYS

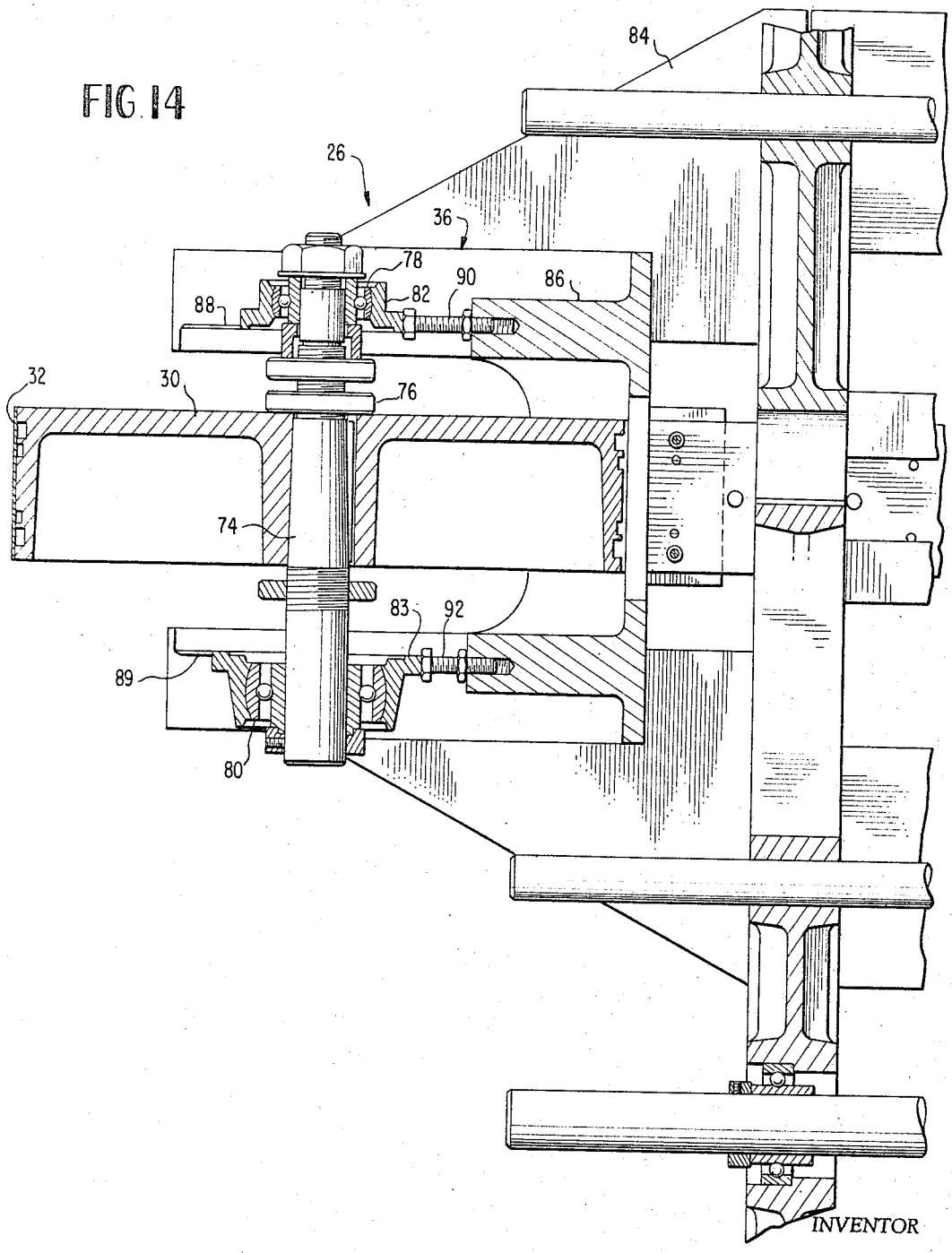

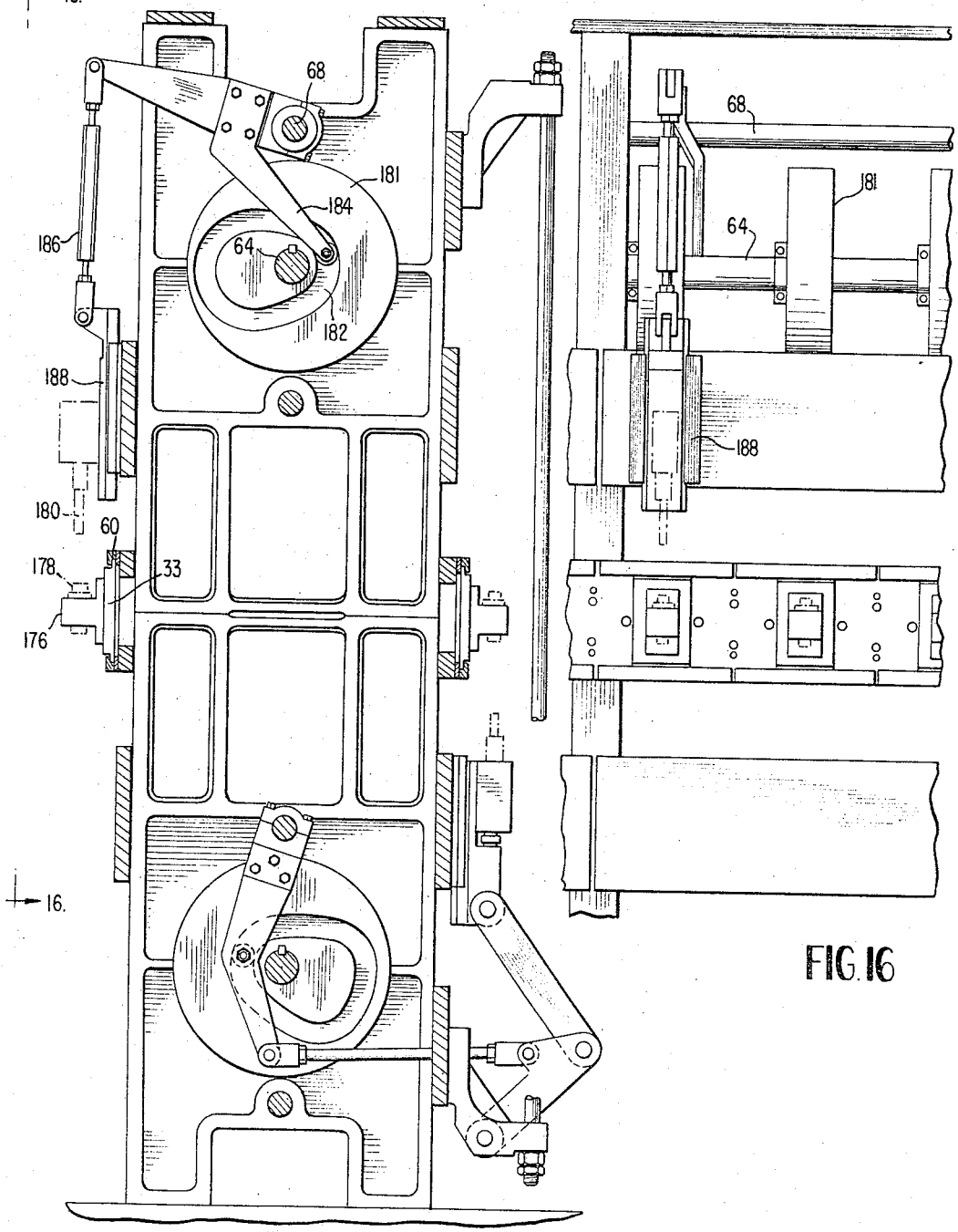

United States Patent Office 3,379,298
Patented Apr. 23, 1968

3,379,298
INDEXING ASSEMBLY MACHINE
Grant N. Willis, Bristol, Conn., assignor to Arthur G. Russell Company, Incorporated, Bristol, Conn., a corporation of Connecticut
Filed Jan. 28, 1966, Ser. No. 523,636
7 Claims. (Cl. 198—19)

This invention relates to improvements in indexing assembly machines, and more particularly to an indexing assembly machine of the in line type utilizing modular sections and indexing work holders by means of a special prestressed steel drive band.

In many manufacturing operations, automatic assembly machines of the type carrying a workpiece to multiple work stations in an indexing operation are required. At each of the work stations a tool or transfer device may accomplish a stage of operation or assembly on the workpiece. Typically, prior art devices of this type utilize a chain or linkage work holder carrier, a plurality of driven shafts for cams, tooling, etc., and are comparatively large and expensive.

It is an object of this invention to provide a versatile standardized automatic assembly machine utilizing a modular construction allowing enlargement, reduction in size of the machine to meet job requirements or provide for future expansion or rearrangement.

Another object of this machine is to provide a work holder supporting and indexing drive band, which eliminates cumulative inaccuracies developed by linkages such as chains and the like.

A further object of this invention is to provide an automatic machine which is rugged in construction, has both initial and long term accuracy, and permits control of multiple tools from a single cam line.

Other objects will be in part obvious and in part pointed out in more detail hereinafter.

The invention accordingly consists in the features of construction, combinations of elements and arrangement of parts which will be exemplified in the construction hereafter set forth and the scope of the application which will be indicated in the appended claims.

In the drawings:

FIG. 1 is a side elevational view of the indexing assembly machine of this invention with the tooling and accessories not shown for the sake of clarity.

FIG. 2 is a top plan view of the machine shown in FIG. 1.

FIG. 3 is a side elevation view of the indexing assembly machine illustrating the modular construction features and the possibilities for expansion.

FIG. 4 is a transverse sectional view taken along line 4—4 of FIG. 1.

FIG. 5 is a transverse sectional view taken along line 5—5 of FIG. 1.

FIG. 6 is an enlarged detail side elevational view of a portion of the drive band with a work holder attached thereto.

FIG. 7 is a sectional view taken along line 7—7 of FIG. 6.

FIG. 8 is a view similar to FIG. 7 but with the band and plate removed illustrating the fixed guide.

FIG. 9 is a perspective view of a portion of the drive band and work holder.

FIG. 10 is an end elevational view taken along line 10—10 of FIG. 10.

FIG. 14 is an enlarged longitudinal sectional view taken along line 14—14 of FIG. 2.

FIG. 15 is a transverse sectional view showing typical tooling applied to the indexing assembly machine of this invention.

FIG. 16 is a fragmentary sectional view taken along line 16—16 of FIG. 15.

Figure 11:
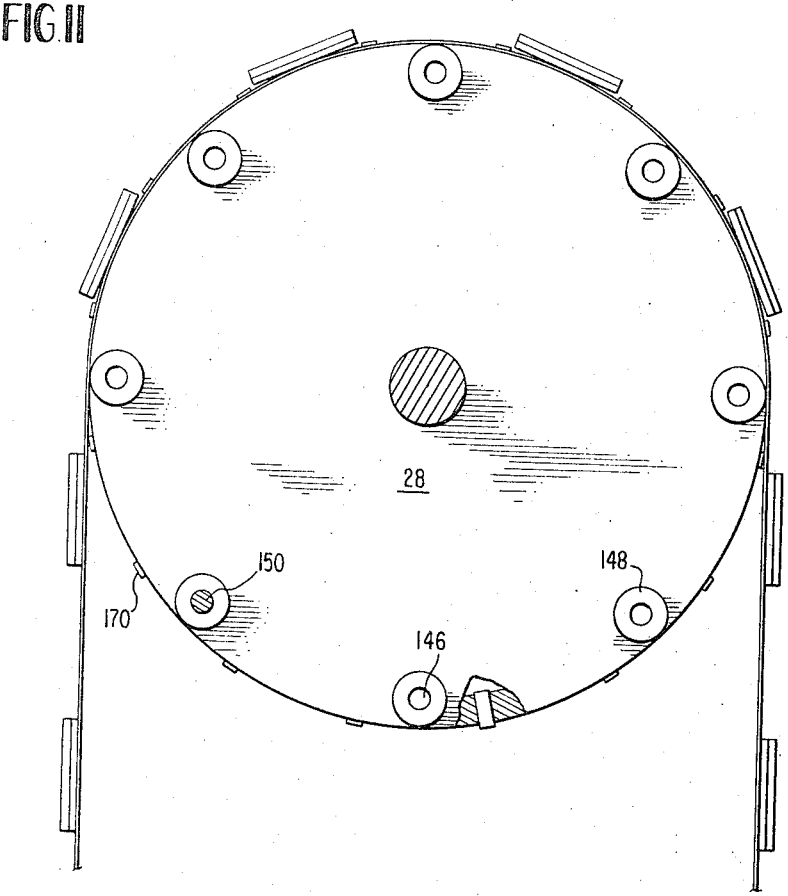
FIG. 11 is a sectional view taken along line 11—11 of FIG. 10.

Referring to the drawings, especially FIGS. 1, 2 and 3, the general assembly of the machine includes a base 18 which supports at least a portion of the machine. The machine is made up of a number of modular sectional units such as large or tall modular sectional units or bays 20 and shorter units or bays 22. These modular units are assembled in any desired arrangement depending upon the work tools to be utilized with the device. As shown in FIG. 1, the tallest modular sectional unit 20 sits on base 18 and is secured to one shorter modular unit 22. By way of contrast in FIG. 3, there are several modular units 20 attached to several modular units 22. This is graphical evidence of the way the machine of this invention can be expanded or rearranged by merely expanding or rearranging the modular units.

At each end of the assembled modular units there is an end frame supported from the end of modular units. These are shown in FIGS. 1 and 3 as end frames 24 and 26. End frame 24 supports a drive drum 28 and end frame 26 supports an idler drum 30, both of which rotate generally in a horizontal plane.

An endless steel drive band 32 which is relatively flat and thin is positioned around the periphery of the drums 28 and 30. Work holder supports 33 may be attached to the drive band 32 at spaced intervals. The driven drum 28 and accordingly the prestressed steel drive band 32 are indexably driven by an indexing drive assembly 34. Additionally, a prestressing assembly 36, FIG. 2, is provided for prestressing and placing a predetermined amount of tension in the steel drive band.

If a chain carrier endless drive member were to be used on the indexing device as in the prior art, variations in the chain link size as well as normal link wear cause inaccuracies in the positioning of the work at the index stations. In other words, variations in a drive carrier present substantial alignment problems between workpieces after they are indexed at a station and the tooling at the station. Such variation including slack in the chain permit oscillation of the workpiece carrier upon stopping for indexing, thus placing a limit on the speed of operation of the indexing. With this invention the pretensioning assembly 36 places the band upder tension so that the tension in the band exceeds the sum of frictional load and inertia load on the band. This inertia load includes any load from items carried by the band, such as the workpiece carrier and workpiece. During index movement the total tension in the band is the sum of the pretension or prestressing, frictional load, and inertia load at any time during the index movement. During a dwell period the band tension is, of course, only equal to the pretension or prestressing in the band. Substantial pretension or prestressing of the drive band is necessary in order to provide positive drive. To this prestreessing is added the frictional load which is relatively small. Inertia load, due to the inertia of the drive band and the items carried by it, will add to the prestressing and friction load of the band during acceleration and subtract during deceleration.

The sectional modular units are made from sectional cast frames called sampsons and connecting members. FIGS. 4 and 5 show the tall and regular size frames for the modular units. Referring to FIG. 4, the tall frame includes a lower sampson frame casting 38 and an upper sampson frame casting 40 secured thereto. The shorter modular units cross support frames include the same lower sampson frame 38 but a shorter upper sampson frame 42 attached thereto. Referring to FIG. 4, bolts 44 secure the first sampson frames to the base 18, while certain other sampson frames may have an adjustable foot 46 with leveling screws 48 as shown for the unit in FIG. 5. The sampson frames are held together by suitable bolts 50 and have holes 52 therein for lightening and conduit purposes, as well as other holes, such as holes 54 precision bored for pivot shafts and bearing holes 56. Work holder guides 58 are attached to the side edges of the sampson frames to guide the work holders 33 caried by the belt 32. The work holder guides include guide slots 60 for the tip end of the work holders 33.

Referring to FIG. 1 as well as FIGS. 4 and 5, side tie plates 62 positioned above and below the level of the band 32 tie together the castings for the upper and lower sectional modular units and these side tie plates also include suitable holes for supporting tooling, not shown in these figures. Additionally, a top tie plate 63 may be provided. The modular units have a common upper cam shaft 64 and lower cam shaft 66. That is, each cam shaft extends completely through each of the modular units so that there is one cam shaft above the level of the band and another one below the level of the band. This cam system efficiently interlocks all operations and eliminates complex combinations of electric, electronic, pneumatic and hydraulic controls in the indexing machine itself. Additionally, there are upper and lower tool pivot and tie rods 68 which extend completely through all of the sectional modular units as shown in FIGS. 1 and 3, for example.

The prestressing assembly 36 within end frame 26 is utilized to move the idler drum 30 away from the drive drum 28 and hence place more stress in the drive band 32. The prestressing assembly is best shown in FIG. 14. Idler drum 30 is mounted on idler shaft 74 and collars 76 are utilized to position the idler drum relative to the shaft. The idler shaft 74 is supported vertically and rotatably by self-aligning ball bearings 78 and 80. These bearings are supported by movable bearings supports 82 and 83, respectively. The end frame 26 includes end tie plates 84 which support an end support casting 86. The end support casting 86 has upper and lower tracks 88 and 89 which can also be seen in FIG. 2. These tracks allow for movement of the bearing supports 82 and 83 thereon and hence for movement of the idler drum 30. This movement is for the purpose of prestressing and placing pretension in the steel drive band 32 and is accomplished by adjustable screw and lock nut assemblies 90 and 92. The prestressing or pretensioning of the steel drive band eliminates any cumulative inaccuracies which are inherently developed by linkages, chains, etc.

End frame 24 and drive drum 28 are best seen in FIGS. 10 and 11. End frame 24 includes end tie plates 94 on each side attached to and carrying an end support casting 96. The end support casting rotatably journals drum drive shaft 98 by means of suitable bearing 100.

The general drive arrangement can be seen with reference to FIGS. 1 and 2 and includes a drive motor 102 which drives, through belt 104 and adjustable speed pulley arrangement 106, a gear box 108. The gear box has two output shafts, one an indexed output shaft 110 extending vertically upward and the other a constantly rotating output shaft 112 extending horizontally.

Figure 12:
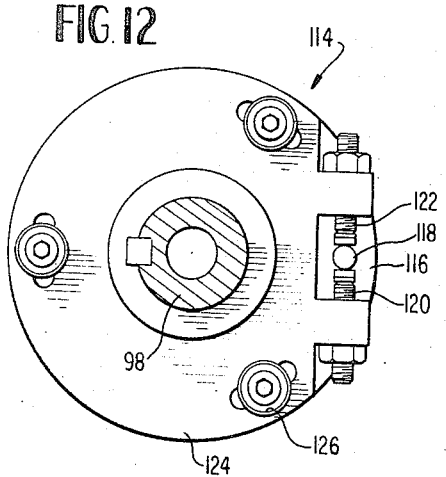
FIG. 12 is a sectional view taken along line 12—12 of FIG. 1.

The indexed output shaft 110 includes an angular adjustable drive coupling 114 shown in detail in FIG. 12 to enable adjustments to be made in the relative rotation of the index drive. The coupling 114 includes a drive plate 116 with a pin 118 extending therefrom which is sandwiched between adjustable screws 120 and 122 carried by driven collar 124 keyed to drum drive shaft 98. Adjustable locking screws 126 may be provided between the plates 116 and 124 for further locking in adjusted drive position.

Figure 13:
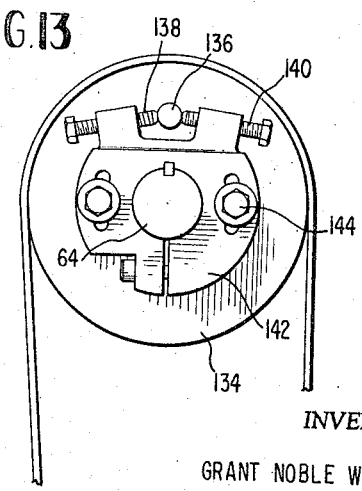
FIG. 13 is a detail view looking in the direction of line 13—13 of FIG. 1.

The drive from the constant output shaft 112 is by means by silent chains 128 to drive a sprocket on lower cam shaft 66 and further silent chains 130 to drive a sprocket on upper cam shaft 64. Both of the cam shafts may also be provided with an angular adjustable drive coupling, such as coupling 132 shown on the upper cam shaft and shown in detail in FIG. 13. This drive coupling includes a freely rotatable sprocket 134 having an extending pin 136 which is sandwiched between adjusting screws 138 and 140 carried by collar 142 keyed to upper cam shaft 64. Thus, the angular position of sprocket 134 with respect to cam shaft 64 may be adjusted. Locking screws 144 may be provided for locking after the adjustment.

As the work which is carried by work holder 33 moves to each work station, the index drive enters a dwell period and the drive drum 28 is stopped. Not only is the drum stopped but it is interlocked under the control of the cam shaft 66 so that tooling controlled by cam shaft 66 can operate without fear of shifting of the work. This interlock includes index holes 146 in the bottom face of drive drum 28, see FIGS. 10 and 11. Collars 148 are carried by the index holes and an index hold pin 150 is selectively reciprocable through end support casting 96 into the collars during index dwell period. The index hold pin includes an adjustable turnbuckle linkage 152 attached to a bell crank 154 pivotally supported from a support 156 and the bell crank includes a cam follower 158 following the periphery of cam 160 on cam shaft 66. Thus, rotation of the cam shaft to actuate the tooling during the dwell period of the indexing movement also operates cam 160 to force locking pin 150 to hold the drive drum 28 in any one of its index positions. As can be seen in FIG. 11, there are a number of index holes. Spring 162 is provided for biasing the cam follower 158 against cam 160. Also, as shown in FIG. 10, tension in the silent chains 128 and 130 may be adjusted to a predetermined degree by chain adjusting assemblies 161 and 163, respectively.

Referring now to the prestressed steel drive band 32 shown in FIG. 9, this band may be of any desired and suitable material but it is preferably formed of stainless steel or high carbon spring steel. The band has a plurality of positioning holes 164 along its periphery and work holder locating and securing holes 166 near the edges and spaced between the holes 164. The work holder 33 has similar holes 168 mating holes 166. Holes 164 cooperate with position pins 170 extending from drive drum 28, see FIGS. 10 and 11. This arrangement prevents any possibility of shifting of the drive band on the drive drum. The work holder 33 is secured to the drive band by suitable screws 172 as shown in FIG. 7 and are further located by dowel pins 174.

FIGS. 15 and 16 show the application of tooling of an exemplary nature to operate on work at the various index stations. As can be seen, drive band 32 carries work holder 33 guided in groove 60, and fixedly secured to the work holder 33 is a platform 176 which may carry suitable work 178. Tooling 180 of a known type for operating on work 178 may be selectively operated under the control of cam 181 having cam groove 182 therein. The cam is keyed to the upper cam shaft 64 for synchronous operation with the indexing of the work. It is noted that there may be several cams 181 for each modular sectional unit, as shown in FIG. 16. Thus, there are also several work stations per module possible. The tooling 180 in the particular instance shown is controlled from cam 181 through a cam follower crank arm 184 pivotally mounted on upper shaft 64 and driving a linkage 186 resciprocating the tooling 180 in slide 188.

It can be seen that applicant has provided a versatile standardized indexing assembly machine utilizing modular sectional units precisely fitted to a manufacturer's current assembly needs, while at the same time allowing for future expansion and rearrangement. The sectional modular units may be added as called for by work requirements. Tooling and accessory mountings provided above and below the work stations on both sides of the machine with upper and lower cam shafts running the full length of the machine, provides for control from a single main drive and cam system and efficiently interlocks all operation, eliminating complex combinations of electric, electronic, pneumatic and hydraulic controls in the machine itself. Work holder platforms attached to and indexed by the special prestressed steel drive band eliminate the inaccuracies which accumulate in prior art linkages, chains and the like, while precision located pins prevent shifting of the drive band on the drive drums.

As will be apparent to persons skilled in the art, various modifications and adaptations of the structure above described will become readily apparent without departure from the spirit and scope of the invention, the scope of which is defined in the appended claims.

I claim:
1. An indexing assembly machine comprising:
   (a) a base,
   (b) modular sectional units capable of supporting and operating tooling and accessories, the sections assembled together and at least partially supported on the base, said modular sectional units including a common cam shaft and pivot shaft extending therethrough and a main drive means for driving the cam shaft,
   (c) a pair of end frames, one at each end of the assembled modular sections,
   (d) a drive drum rotatably supported on one end frame in a horizontal plane,
   (e) an idler drum rotatably supported on the other end frame,
   (f) an indexing drive for the drive drum, said indexing drive being driven by said main drive means,
   (g) a relatively flat endless steel drive band positioned around the drums,
   (h) means for adjustably tensioning the steel drive band, and
   (i) work holders attached to the outside of the drive band.

2. An indexing assembly machine as in claim 1 wherein there is an upper cam shaft above the level of the drive band and a lower cam shaft below the level of the drive band, the cam shafts carrying cams for controlling and interlocking the operation of tooling.

3. An indexing assembly machine as in claim 1 wherein the cam shaft operates interlocking means for positively interlocking the drive drum during a dwell of the indexing drive and at the time the cam shaft is operating tooling.

4. An indexing assembly machine as in claim 1 further including an angularly adjustable drive coupling between the main drive and the cam shaft and another angularly adjustable drive coupling between the main drive and the drive drum.

5. An indexing assembly machine as in claim 1 wherein each modular sectional unit includes, an upright support frame extending transversely between runs of the drive band, side plates above and below the level of the band on both sides of the support frame, and work holder guides attached to both sides of the support frames for guiding and supporting work holders carried by the drive band.

6. An indexing assembly machine as in claim 5 further comprising tooling means at least partially supported by the side plates and actuated by the cam shaft while oscillating about the pivot shaft.

7. An indexing assembly machine comprising:
   (a) a frame,
   (b) a drive drum and an idler drum supported on said frame for rotation about vertical axes,
   (c) a relatively flat endless steel band positioned around the drums,
   (d) means for adjustably tensioning said steel drive band,
   (e) a cam shaft supported on said frame for operating tooling and accessories supported on said frame,
   (f) a plurality of work holders attached to the outside of the drive band, and
   (g) an indexing drive for the drive drum, and main drive means for said cam shaft, said indexing drive being driven by said main drive means.

References Cited
UNITED STATES PATENTS

| | | | |
|---|---|---|---|
| 356,930 | 1/1887 | Emerson | 143—20 |
| 882,056 | 5/1906 | Knox | 143—133 |
| 931,223 | 8/1909 | Stevens | 143—49 |
| 2,641,020 | 6/1953 | Clemens | 17—43 |
| 2,787,299 | 4/1957 | Anderson | 143—137 |
| 2,793,733 | 5/1957 | Karageorgieff | 198—19 |

RICHARD E. AEGERTER, *Primary Examiner.*

EVON C. BLUNK, *Examiner.*